United States Patent [19]

Vought

[11] 4,403,876
[45] Sep. 13, 1983

[54] PRINT ELEMENT MOUNTING APPARATUS

[75] Inventor: Kenneth D. Vought, Cortland, N.Y.

[73] Assignee: SCM Corporation, New York, N.Y.

[21] Appl. No.: 304,527

[22] Filed: Sep. 21, 1981

[51] Int. Cl.³ ............................................. B41J 1/08
[52] U.S. Cl. ................................. 400/144.2; 400/175;
403/261; 403/327; 403/372
[58] Field of Search ............................ 400/144.2, 175;
403/372, 373, 261, 256, 257, 326, 327, DIG. 6

[56] References Cited

U.S. PATENT DOCUMENTS

| | | | |
|---|---|---|---|
| 2,757,942 | 8/1956 | Eberhart | 403/326 X |
| 3,878,929 | 4/1975 | Orlens et al. | 400/175 OR |
| 3,986,593 | 10/1976 | Orlens et al. | 400/144.2 OR |
| 4,019,824 | 4/1977 | Percy | 403/261 |
| 4,036,348 | 7/1977 | Guerrini | 400/175 X |
| 4,043,685 | 8/1977 | Hyams | 403/326 X |
| 4,049,110 | 9/1977 | Frechette | 400/175 OR |

FOREIGN PATENT DOCUMENTS 275904 9/1951 Switzerland .................. 403/DIG. 6

OTHER PUBLICATIONS

IBM Technical Discloser Bulletin, vol. 18, No. 9, Feb. 1976, pp. 2988-2989 "Print Disk Attachment".

*Primary Examiner*—Edgar S. Burr
*Assistant Examiner*—Moshe I. Cohen
*Attorney, Agent, or Firm*—William E. Mear, III; Ernest F. Weinberger

[57] ABSTRACT

A print element mounting apparatus for attaching and removing a print disc to and from a selector shaft in a printing machine. The apparatus comprises a finger-grip cap which is fixed on the print disc and a coupling device carried by the print disc. The coupling device includes a generally circular shaped unitary flex member made from yieldable half-sections which are continually urged towards one another by a spring wrapped about the flex member. Each half-section includes a pair of pressure surfaces which are curved in complementary relation to form a biased opening at the central portion of the flex member. The selector shaft is fabricated to include tapered surfaces that operate in conjunction with the pressure surfaces to afford snap-action operation during interchange of the print disc accomplished through a push or a pull force axially applied to the cap. When the print disc is attached on the selector shaft, inward biasing tension from the spring causes the pressure surfaces to clamp about the selector shaft at a consistently accurate location for printing.

1 Claim, 3 Drawing Figures

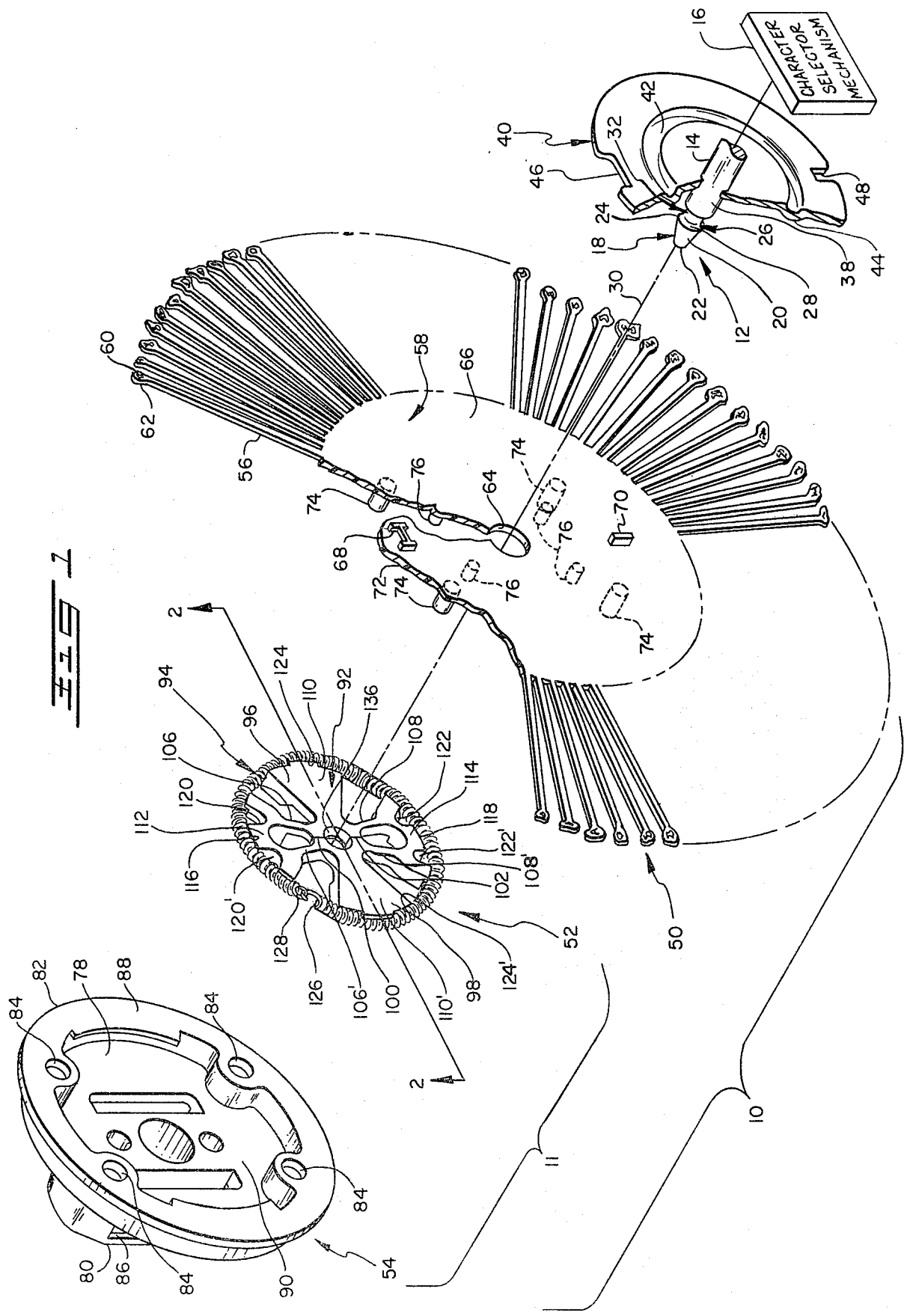

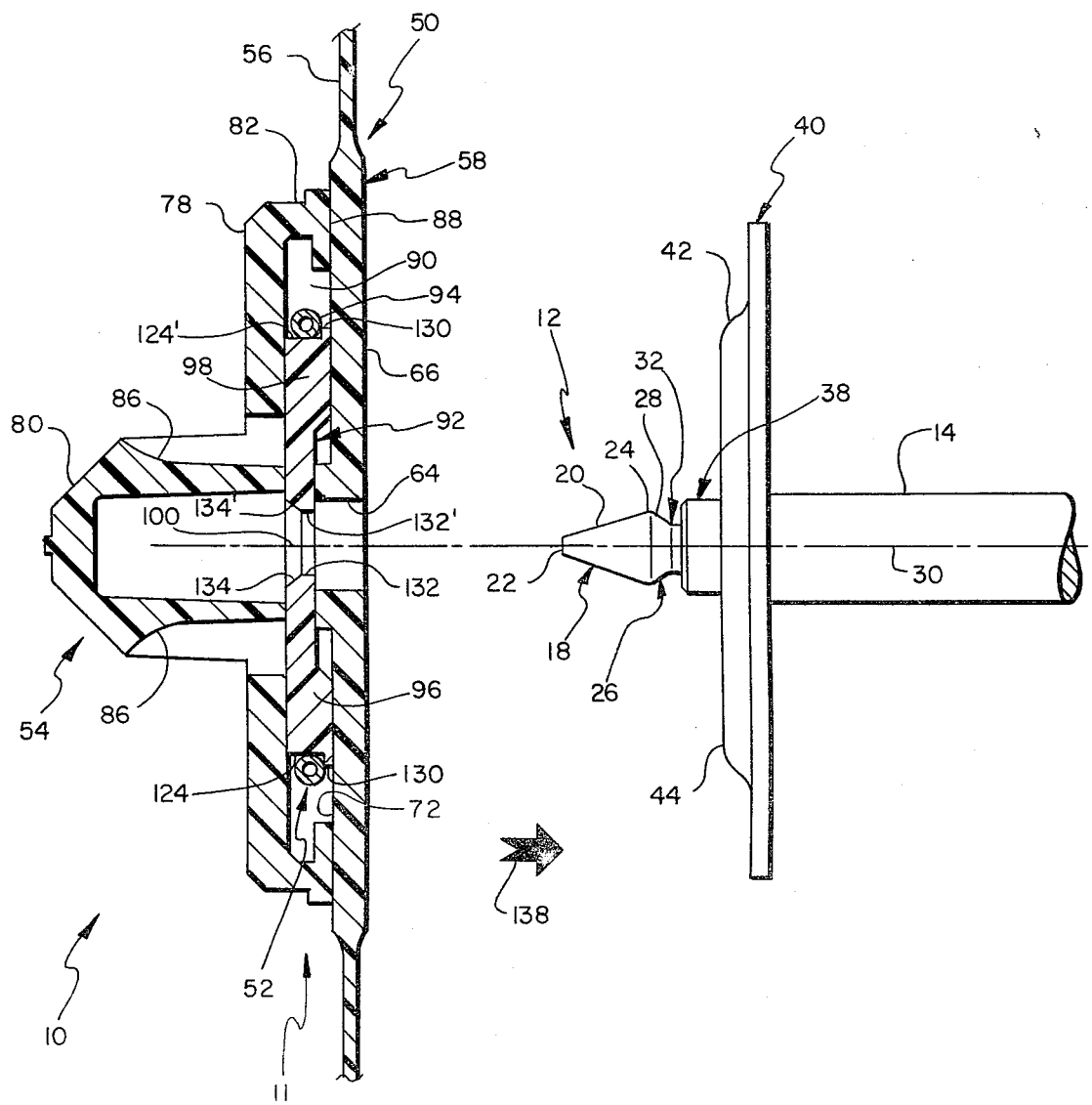

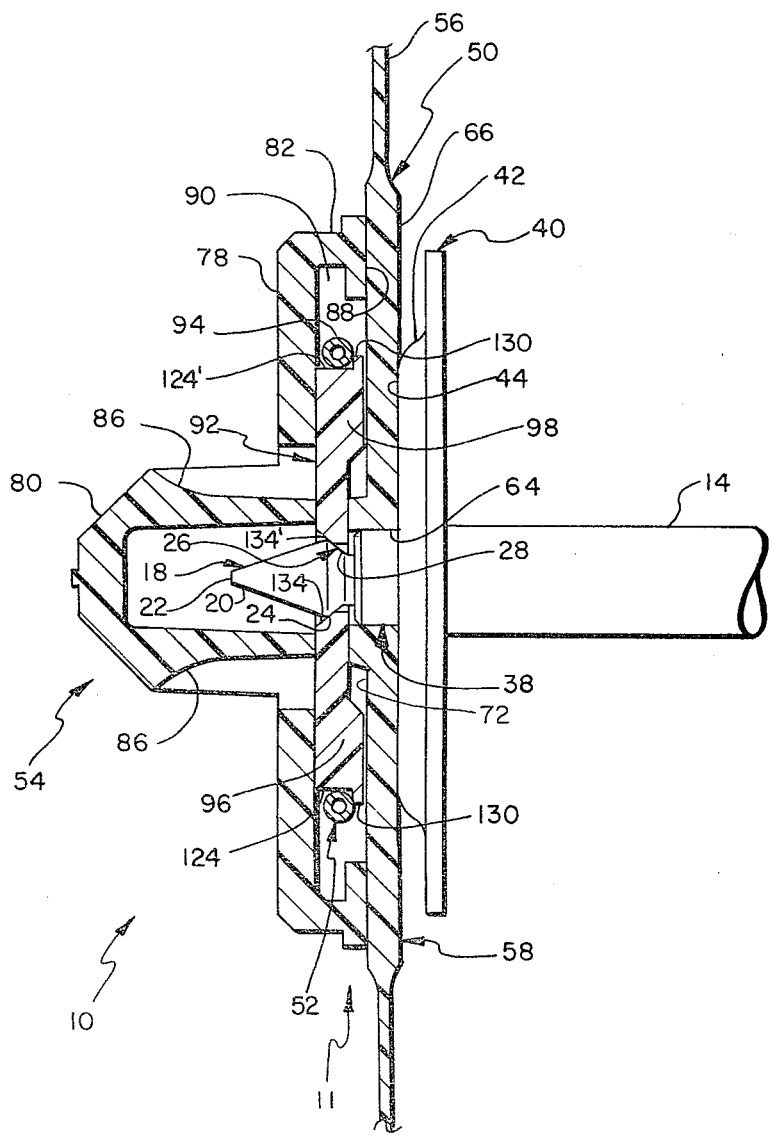

PRINT ELEMENT MOUNTING APPARATUS

BACKGROUND OF THE INVENTION

This invention relates, generally to print element apparatus and more particularly to a print element mounting apparatus used to accommodate quick and easy interchange of a print disc from a selector shaft in a printing machine or the like.

Printing machines and particularly typewriters are becoming increasingly more versatile in their performing capabilities. Many of today's typewriters are being manufactured of the kind employing a single print head or element which contains thereon a complete arrangement of alphabet characters which are selectable from corresponding keys of a keyboard. There are basically two different common forms of single print elements known and widely used in the art. They are usually referred to as "ball" or "disc" type elements which generally describes their overall appearance. A major advantage offered by single print element typewriters, over bar typewriters, is that the element may be adapted with a coupler to conveniently facilitate interchange among different elements to meet a particular work need or desire or to replace a damaged element. For example, a business letter requires an element having alphabetical characters, which are available in different styles and sizes, such as pica and elite. Technical work would require an element containing special characters such as mathematical or scientific notations and symbols.

The prior art discloses many varied and different coupler arrangements for enabling detachable mounting of a print element in a printing machine. One example is disclosed in U.S. Pat. No. 4,036,348 entitled FIXING DEVICE FOR A TYPE-CARRIER DISK granted July 19, 1977 to Guerrini. This patent teaches four individual fixing members pivotally mounted and spring-biased on a specially formed flange fixed on a selection shaft. The print disc has an aperture that squeezes the four members together in response to attaching and removing the print element. The Guerrini patent has many disadvantages including its overall complexity wherein many costly, relatively small and difficult to assemble parts are employed. Since the disc coupling members are assembled directly on the printer shaft, a complete machine shut-down is necessary in the event service maintenance is needed to repair damaged or worn members of the disclosed fixing device.

Two other examples of a disc coupler device are disclosed in U.S. Pat. Nos. 3,878,929 granted Apr. 22, 1975 and 3,986,593 granted Oct. 19, 1976; both invented by Orlens et al. Both aforementioned patents utilize a plastic coupler which is molded as part of a disc. Each molded coupler includes a shaft-grasping configuration connected to the disc via flexible arms. In order to attach or remove the disc, the arms need to be bent by applying finger squeezing pressure which may be an initiating stress to the fingers. A resilient memory plastic material is utilized to form the flexible arms. This kind of plastic inherently tends to lose some of its resiliency over a period of time after many uses and, therefore, the arms may not completely return to their original relaxed state for positively gripping the shaft. Though in terms of parts required, these integral one-piece couplers are relatively simple. However, the element itself is highly complex and difficult to mold which leads to manufacturing problems.

The present invention avoids disadvantages found in these and other known prior art print element couplers and provides a print element equipped with an extremely simple mounting apparatus so as to readily enable one to quickly attach and remove a print disc in a comfortable convenient manner.

SUMMARY OF THE INVENTION

In accordance with the concepts disclosed in this application, the present invention provides a print element mounting apparatus including a spring biased flex member carried in a print disc having a convenient finger-grip cap. The mounting apparatus operates in conjunction with a tapered selector shaft in a printing machine so that the print disc is easily and quickly attached and removed from the selector shaft in snap fashion. When the print disc is on the selector shaft, a biased clamping load from the flex member serves to positively hold and accurately locate the print disc along the selector shaft for consistent quality printing.

It is an object of the present invention to overcome the disadvantages of the prior art by providing a simple, inexpensive print element mounting apparatus that operates in conjunction with a selector shaft for enabling quick and easy attaching and removing of a print disc from a printing machine.

Another object of the present invention is to provide a print element mounting apparatus that continues to operate while the print disc is on the selector shaft so as to positively hold and accurately locate the print disc for quality printing.

Other objects and advantages of the present invention will be evident from the specification and claims when read in conjunction with the accompanying drawing illustrative of the invention.

BRIEF DESCRIPTION OF THE DRAWING

FIG. 1 is an exploded view, in perspective, showing component parts comprising a print element mounting apparatus according to the present invention.

FIG. 2 is an enlarged cross-sectional view taken along line 2—2 of FIG. 1 showing, in detail, the assembled component parts of the present print element mounting apparatus carried by a print disc depicted removed from a selector shaft.

FIG. 3 is a view similar to FIG. 2 showing the assembled print disc clamped on the selector shaft.

DESCRIPTION OF THE PREFERRED EMBODIMENT

Referring initially to FIG. 1, a print disc assembly, generally depicted by reference numeral 10, is shown in an exploded unassembled manner to clearly illustrate component parts comprising the assembly including a print element mounting apparatus 11 built according to the present invention. There is also illustrated an end 12 of a selector shaft 14 used for supporting and driving the print disc assembly 10 in a printing machine (not shown).

Selector shaft 14 is operatively connected to a character selector mechanism, represented by box 16, in the printing machine and is rotatable thereby in a controlled manner according to e.g., key signal input. End 12 of selector shaft 14 comprises four differently shaped portions, most clearly shown in FIGS. 2 and 3. The first portion is a nose portion 18 which is conical shaped having a tapered surface 20 that gradually increases circumferentially from a tip 22 to a major circumference at 24. The second portion serves as a mounting portion 26 on which apparatus 11 sits when attached on selector shaft 14 as in FIG. 3. Portion 26 has a sloped surface 28 that circumferentially decreases from major circumference 24 towards an axis 30 away from nose portion 18 of the selector shaft 14. The third portion is a cylindrically shaped neck 32 extending rightwardly away from sloped surface 28. The fourth portion is a cylindrical shaft 28 integrally connected and circumferentially enlarged compared to the neck 32. Shaft 38 has a circumference dimension slightly greater than the major circumference 24 of nose portion 18. A generally circular plate 40 is fixed, e.g., by braze welding, on the shaft portion 38. An off-set ring 42 (best shown in FIG. 1) is formed from plate 40 to project outwardly therefrom toward end 12 of selector shaft 14. An outward face surface 44 of off-set 42 is machined to be flat, e.g., by grinding, after plate 40 is secured on shaft 38 so as to be perpendicular to axis 30 and to precisely locate face surface 44 in a controlled spaced relation from sloped surface 28 of mounting portion 26. Two diametrically opposed notches 46 and 48 are cut in plate 40 with upper notch 46 being wider than lower notch 48 as illustrated in FIG. 1.

With continued reference to FIG. 1, print disc assembly 10 is built from three basic component parts, namely, a print disc 50 a coupling retainer 52 and a cap 54, the latter two components 52, 54 form apparatus 11.

Print disc 50 is generally a flat circular wheel having a plurality of petals 56 radially extending from a circular hub section 58. A character imprinting slug 60 is molded onto an end 62 of each petal 56. A central aperture or circular hole 64 extends through hub section 58. Hole 64 is sized slightly greater circumferentially than major circumference 24 of nose portion 18 so as to allow free passage therethrough and to be closely received on shaft portion 38 for coaxial support of print element 50 on end 12 of selector shaft 14 as is shown in FIG. 3. A front face surface 66 of hub section 58 is substantially flat and has two diametrically opposed projections 68 and 70 extending outwardly from face surface 66 towards selector shaft 14. Projections 68, 70 are sized for close receipt in notches 46 and 48, respectively, in plate 40. A back surface 72 of hub section 58 has two groups of four pins 74 and 76 extending outwardly therefrom towards cap 54. The four pins comprising group 74 are radially arranged further from hole 64 and are slightly larger diametrically than the four pins of group 76. Some of the pins in each group 74, 76 are illustrated by dashed lines in FIG. 1 to show their location on the back surface 72 and their relation for assembly thereon of components 52 and 54.

Cap 54 comprises three basic sections including a flange 78, a finger-grip construction 80 and a band 82. These three sections 78, 80 and 82 are integrally molded together to form a unitary structure made from a plastic material. FIG. 1 shows cap 54 orientated in a correct relation for assembly onto back surface 72 of print disc 50. Four circular recesses 84 are arranged and sized on band 82 so they correspond with and are closely received by the group of pins 74 on hub section 58. Finger-grip construction 80 extends outwardly from flange 78 in a direction away from print disc 50. Vertically orientated side surfaces 86 are indented so as to enable comfortable finger engagement for positively grasping cap 54. Band 82 encircles the periphery of flange 78 and projects outwardly therefrom towards hub section 58 of print disc 50. A face surface 88 of band 82 is flat for face-to-face abutment with back surface 72 of hub section 58 when cap 54 is assembled onto print disc 50. A cavity 90 is formed in cap 54 defined by band 82 and flange 78.

Coupling retainer 52 is a composite structure being made up of two components which include a flex member 92 and a coil tension spring 94. Flex member 92 is generally a circular shaped unitary part fabricated from a suitable flexible plastic material, such as an acetal resin having flexure ability. Flex member 92 has two half-sections 96 and 98 which are centrally separated by vertical slits 100 and 102 so as to be yieldable relative to each other. The two yieldable half-sections 96, 98 are fabricated in mirror fashion with similar features contained on one section (96) being included on the other section (98) in opposing relation. In this regard, reference numbered features on yieldable section 96 are correspondingly assigned the same number on yieldable section 98, distinguishable by a prime symbol. As shown in FIG. 1, an upper pair of arms 106, 106' and a lower pair of arms, 108, 108' are molded thin enough in cross-section so that they exhibit flexibility. Solid V-shaped portions 110, 110' are connected to an upper cross-member 112 by upper arms 106, 106' and to a lower cross-member 114 by lower arms 108, 108'. The two cross-members 112, 114 are of solid construction, and, therefore, serve to integrally join the two yieldable sections 96, 98 at their respective upper and lower locations. V-shaped portions 110, 110' and cross-members 112, 114 are molded thicker in cross-section than the four flex arms 106, 106', 108, 108' and are thus, substantially rigid. An edge surface 116 of cross-member 112 and an edge surface 118 of cross-member 114 each include a pair of spaced apart notches with 120, 120' being on surface 116 and 122, 122' being on surface 118. These four notches 120, 120' 122, 122' are arranged so as to be aligned for close receipt on the four smaller pins 76 on hub section 58 of the print disc 50 for coaxial support thereon of flex member 92. Coil tension spring 94 is wrapped about the periphery of flex member 92 by engaging edge surfaces 116, 118 of cross-members 112, 114 and edge surfaces 124, 124' of V-shaped portions 110, 110'. The relaxed unassembled length of coil spring 94 is slightly less than the circumference measured about flex member 92 so that when end loops 126, 128 are hooked together about flex member 92 as illustrated in FIG. 1, spring 92 continually exerts an inward biasing force that urges the two yieldable half-sections 96, 98 together. A plurality of thin walls 130 (FIGS. 2 and 3) project radially extending outwardly from edge surfaces 116, 118, 124, 124'. These walls 130 serve to axially retain spring 94 on the periphery of flex member 92.

Looking at the yieldable sections 96, 98 in cross-section, as is shown in FIG. 2, it can be seen that a first pressure surface 132, 132' on each yieldable half-section 96, 98 extends parallel to axis 30 near the center of flex member 92. A second pressure surface 134, 134' on each yieldable half-section 96, 98 is inclined to extend outwardly from each of the first pressure surfaces 132, 132', respectively. Pressure surfaces 132, 132', 134, 134' are arcuately shaped, as viewed from the front in FIG. 1 to form an expandable opening 136.

To build the present print disc assembly 10, the three main component parts, print disc 50, coupling retainer 52 and cap 54 are axially arranged as is shown in FIG. 1. The coupling retainer 52 is positioned up against hub section 58 of print disc 50 with the group of four small pins 76 closely received in notches 120, 120', 122, 122'. This supports coupling retainer 52 on hub section 58 with opening 136 in coaxial alignment with central hole 64 of the print disc 50. When assembling the coupling retainer 52, the inclined pressure surfaces 134, 134' are orientated so they extend outwardly away from hub section 58, best illustrated in FIG. 2. Cap 54 is then slid over coupling retainer 52 into position on print disc 50 with the group of four larger pins 74 closely received in circular recesses 84. Cap 54 is fixed on to pins 74 by a suitable plastic bonding procedure, such as, plastic welding or a plastic glue agent. With cap 54 firmly assembled on print disc 50, coupling retainer 52 is captured so as to be axially trapped within cavity 90 of cap 54. It should be pointed out that cavity 90 is diametrically larger than coupling retainer 52 so as to allow flex member 92 sufficient room to expand therein.

To attach print disc assembly 10, the operator grasps indented side surfaces 86 of finger-grip construction 80 on cap 54 to manually position central hole 64 of print disc 50 in alignment for insertion onto nose portion 18 of selector shaft 14 as shown in FIG. 2. Assembly 10 is pushed towards plate 40 in the direction indicated by arrow 138. Pressure surfaces 132, 132' come into contact with tapered surface 20 of nose portion 18 and engageably slide thereon causing yieldable half-sections 96, 98 to separate or expand from a closed position against inward biasing from spring 94. When pressure surfaces 132, 132' engageably ride over the major circumference 24 of nose portion 18 onto sloped surface 28 of mounting portion 26, a snap-action motion occurs due to yieldable half-sections 96, 98 being allowed to suddenly collapse caused by release of tension in spring 94.

As is shown in FIG. 3, print disc assembly 10 on end 12 is axially limited when front face surface 66 of hub section 58 abuts with the outward face 44 on off-set ring 42 of circular plate 40. In this position, inclined pressure surfaces 134, 134' come to rest clamped about aloped surface 28 of mounting portion 26 of selector shaft 14. The lateral dimension from front face surface 66 to inclined pressure surfaces 134, 134' is such that pressure surfaces 134, 134' are axially stopped at a location along sloped surface 28 when the print disc assembly 10 is against plate 40. The engaged relation between inclined pressure surfaces 134, 134' and sloped surface 28 serves to continually urge the print disc assembly 10 up against plate 40 owing to inward forces from spring 94. Accordingly, the print disc assembly 10 is axially located in substantially the same position each time it is inserted onto selector shaft 14 and is void of axial end play to thus maintain consistently precise positioning of print disc 50 on selector shaft 14 for quality printing.

In order to rotatably fix print disc assembly 10 on selector shaft 14, the above-mentioned snap-action fastening can only occur when projections 68 and 70 are aligned to be received in notches 46 and 48, respectively. This serves to key the assembly 10 on the selector shaft 14 to prevent the print disc 50 from rotating relative to selector shaft 14.

To remove the print disc assembly 10 from selector shaft 14, the operator simply grasps the finger-grip construction 80 and pulls until overcoming the clamping force from spring 94. During removal of print disc assembly 10 from selector shaft 14, the inclined pressure surfaces 134, 134' engageably slide along sloped surface 28 until they ride over major circumference 24 causing the yieldable half-sections to quickly close together under urging from spring 94. Print disc assembly 10 snaps quickly off nose portion 18 of selector shaft 14.

It should be noted that the biasing force offered by spring 94, urging yieldable half-sections 96, 98 together, is easily overcome with little effort or finger stress felt by the operator when attaching or removing the print disc assembly 10. Attaching print disc assembly 10 is easily accomplished because the tapered construction of nose portion 18 serves to gradually spread or expand the yieldable half-sections 96, 98. Removing print disc assembly 10 is also easily accomplished because the inclined shape of pressure surfaces 134, 134' are gradually spread apart as they ride along sloped surface 28 towards major circumference 24 of the nose portion 18.

It will be appreciated that there has been shown and described a preferred embodiment of the invention arranged to provide a print disc assembly that is easily and positively interchanged from a selector shaft in a printing machine. While the principles of the invention have been made clear in the illustrative embodiment, it is apparent that alternatives, modifications and variations will be evident to those skilled in the art. Accordingly, numerous modifications or alterations may be made without departing from the spirit and the scope of the invention as set forth in the appended claims.

What is claimed is:

1. A print element mounting apparatus for enabling a print disc to be removably attached to a selector shaft in a printing machine, the shaft having a nose portion and a mounting portion, the apparatus comprising:
a flat disc-shaped flex member carried by the print disc, said flex member including;
   a pair of yieldable sections,
   a pair of rigid sections, and
   flex joint means connecting said yieldable sections to said rigid sections for permitting said yieldable sections to expandably move relative to each other;
said flex joint means comprising a first pair of bendable arms connecting one of said pair of yieldable sections to both of said rigid sections and a second pair of bendable arms connecting the other one of said pair of yieldable sections to both of said rigid sections; and
biasing means operatively engaging said flex member so as to continually urge said yieldable sections towards a closed position and, said yieldable sections engagingly clamping about the mounting portion of the shaft under tension when attached thereto and engagingly riding over the nose portion when axially removed therefrom, the tension from said biasing means easily overcome to afford easy removal of the print element from the shaft.

* * * * *